Jan. 3, 1967     A. V. L. C. DEBRIE     3,295,409
MULTIPLE OPTICAL PRINTING MACHINE
Filed Oct. 2, 1964     2 Sheets-Sheet 1

INVENTOR
ANDRÉ VICTOR LÉON CLÉMENT DEBRIE
By
ATTORNEYS

Jan. 3, 1967  A. V. L. C. DEBRIE  3,295,409
MULTIPLE OPTICAL PRINTING MACHINE
Filed Oct. 2. 1964  2 Sheets-Sheet 2
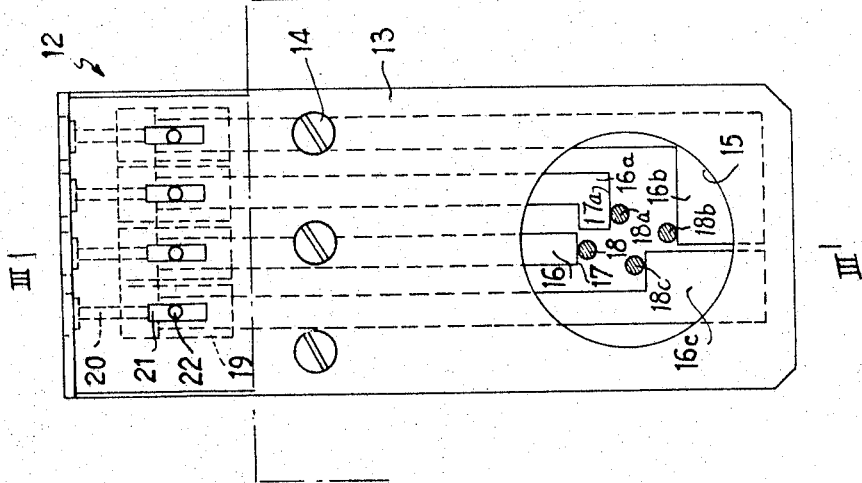
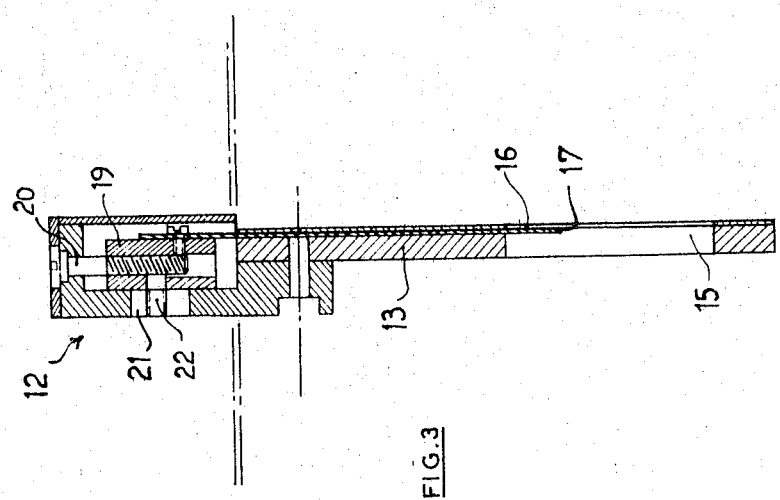
INVENTOR
ANDRÉ VICTOR LÉON CLÉMENT DEBRIE
By *Hammond and Littell*
ATTORNEYS

3,295,409
MULTIPLE OPTICAL PRINTING MACHINE
André Victor Leon Clement Debrie, Paris, France, assignor to Etablissements Andre Debrie, Paris, France, a company of France
Filed Oct. 2, 1964, Ser. No. 401,083
Claims priority, application France, Jan. 23, 1964, 961,348
3 Claims. (Cl. 88—24)

This invention concerns multiple optical printing machines which permit of the production of a plurality of copies simultaneously from one single negative film. For example with such machines it is possible to obtain four 8 mm. films from one 35 mm. negative film. However, difficulties are encountered in ensuring uniform and equal illumination of the printing frames of the positive films.

The invention provides an improvement which permits uniformity to be obtained in the densities of the film impressions which are copied simultaneously from one single negative film.

To this end, a device according to the invention comprises displaceable elements of blade form, in number equal to the number of images to be simultaneously produced, situated in such manner that by displacement of the said elements it is possible partially to cut off the luminous beam passing through such impression aperture at will. The elements of blade form are preferably placed in the illumination system outside the zone separating the negative film from the positive film, and more especially in a plane conjugate with the plane containing the actual diaphragms of the objectives which effect the simultaneous copies.

It is possible to act selectively upon the effective luminous flux for each of the reproduction objectives, and by reason of the conjugation of the two planes envisaged above to avoid a heterogeneous illumination of the impression windows.

Thus by any known or appropriate device, the illumination of each of the impression windows or printing frames will be measured, and by action upon the elements of blade form the luminous flux passing through the pupils of the four objectives may be diminished in such manner that all the impression windows receive the same illumination, which is equal to the weakest of the illuminations. However, instead of effecting the balancing of the illumination of all the impression windows it is possible, if desired, to effect different treatment of the various copies being obtained from one and the same negative film, in order for example to correspond to a different purpose for the utilization of these different copies.

The invention will be further described with reference to the accompanying drawings given by way of example, in which:

FIGURE 2 is an elevational view showing an embodiment of a device according to the invention capable of being incorporated in the apparatus according to FIGURE 1, and FIGURE 3 is a sectional view along the line III—III in FIGURE 2.

Figure 1:
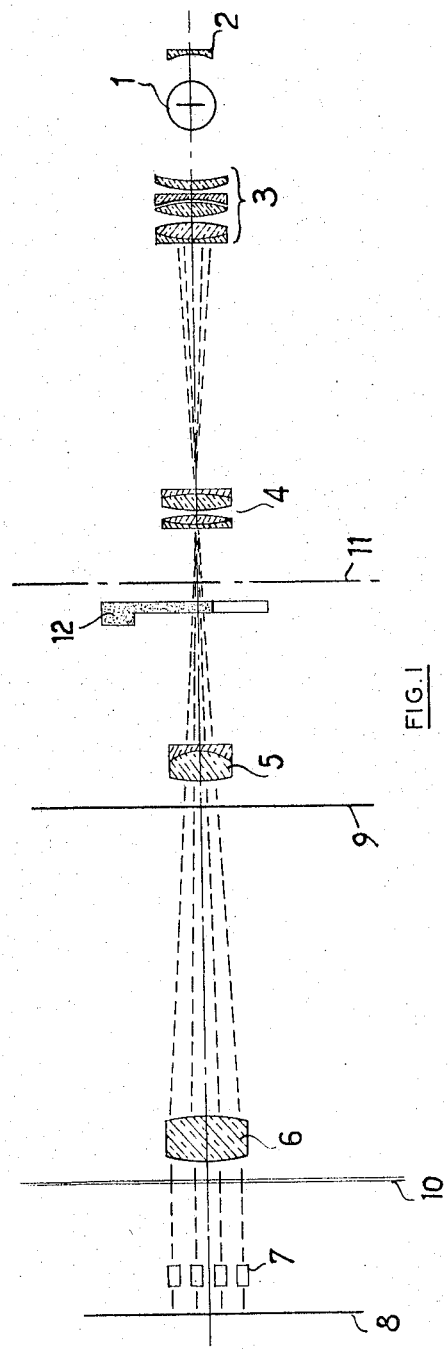
FIGURE 1 is a diagram of the principal elements of a multiple optical printing machine improved in accordance with the invention.

The apparatus of which the elements are represented diagrammatically in FIGURE 1 comprises a light source 1 with which there is associated a mirror 2 which reflects the light rays through an optical system comprising a condenser 3, a first objective 4, a second objective 5 and a reproduction optical system 6 with objectives 7. For the latter there have been represented by way of example four elements permitting of making four simultaneous copies. However, it must be understood that the four objectives are not in reality in the positions indicated diagrammatically in FIGURE 1; in fact they are mounted in such manner that their optical axes are staggered like the light beams 18, 18a, 18b and 18c represented diagrammatically in FIGURE 2.

8 and 9 designate the positive and negative films respectively. Moreover the apparatus comprises a shutter 10 and a mask strip or a sleeve strip 11.

According to the invention, in the light path there is placed a device which permits of acting upon the light flux intended for each of the objectives 7. This device is situated outside the zone separating the negative 9 from the positive film 8, and preferably in the zone conjugate with that containing the four actual diaphragms of the four objectives 7 which produce the four simultaneous copies.

As represented in FIGURES 2 and 3, the device 12 which permits of controlling the luminous fluxes comprises a casing 13 intended to be fixed upon the printing apparatus, for example by screws 14. The casing is formed with an opening 15 which, when the device is in position, is substantially centered upon the optical axis of the printing machine. Inside the casing there are knives or movable blades 16, 16a, 16b, 16c in number equal to the number of the objectives 7. These blades preferably include edges such as 17, 17a which block the light beams 18, 18a passing through the pupils of the four objectives 7, when the said blades are displaced.

In order to effect the displacement of the blades it is possible to adopt the following arrangement: Each blade is fast at its end opposite to the edge 17, with an internally threaded block 19 in which there is engaged a stud screw 20. By rotating the screw more or less one causes the block and the blade which it carries to slide. In order to register the position of the blades it is advantageous to arrange grooves 21 in the casing 13, in which there slide nipples 22 connected with the blocks 19. Finally, the positions of the four blades 16, 16a can be adjusted independently of one another.

A printing machine such as that just described will be operated substantially in the following manner in order to obtain the best results.

Commencement is made by measuring the illumination which would be received by the positive film 8 through each of the objectives 7. For this purpose any suitable devices can be utilized, such as photo-electric cells. This first operation permits of discovering differences of illumination and especially of determining the impression window which receives the weakest illumination. Then the screws 20 are operated to displace the blades 16 which come to affect the light beams passing through the pupils of the objectives, in such manner as to diminish the effective light fluxes at each of them and to produce an illumination equal to the weakest illumination previously discovered. Thus equality is obtained in the densities of the four films copied simultaneously from the negative film 9.

However, if desired, the device according to the invention also permits of effecting a voluntarily different treatment of any one or more of the four copies.

Naturally the embodiment described is given primarily by way of example and can have numerous modifications without departing from the scope of the present invention.

Thus the number of the objectives could be different from four. Similarly it would be possible to place the device at a position other than that indicated by way of preference, but it should be noted that by the strict conjugation of the plane containing the actual diaphragms of the reproduction objectives and the plane containing the blades of the device, a possible asymmetric "vignetting" effect is avoided, which would have the result of a heterogeneous illumination of the window.

What is claimed is:

1. In a multiple optical printing machine, for simultaneously producing a plurality of positive copies from a single negative film, said machine having a light source, means for producing a plurality of light beams from said light source and a reproduction optical system with a plurality of reproduction objectives, each of said light beam passing through one of said reproduction objectives, the improvement comprising means for individually controlling the light flux passing through each of said reproduction objectives, said means for controlling comprising a device comprising a casing, an opening thereon centered on the optical axis of said printing machine and displaceable elements in number equal to the number of said reproduction objectives, said device being placed outside the light path separating said negative film from said positive copies, whereby the displacement of said elements permits individual control of the light flux passing through each of said reproduction objectives.

2. In a multiple optical printing machine, for simultaneously producing a plurality of positive copies from a single negative film, said machine having a light source, means for producing a plurality of light beams from said light source and a reproduction optical system with a plurality of reproduction objectives, having diaphragms thereon, each of said light beams passing through one of said reproduction objectives, the improvement comprising means for individually controlling the light flux passing through each of said reproduction objectives, said means for controlling comprising a device comprising a casing, an opening thereon centered on the optical axis of said printing machine and displaceable elements in number equal to the number of said reproduction objectives, means for separate displacement of said elements, said device being placed outside the light path separating said negative film from said positive copies, in a plane conjugate with the plane containing said diaphragms of said reproduction objectives, whereby the displacement of said elements permits individual control of the light flux passing through each of said reproduction objectives.

3. In a multiple optical printing machine, for simultaneously producing a plurality of positive copies from one single negative film, said machine having a light source, means for producing a plurality of light beams from said light source and a reproduction optical system with a plurality of reproduction objectives, said reproduction objectives each having a diaphragm thereon, each of said light beams passing through one of said reproduction objectives, the improvement comprising means for individually controlling the light flux passing through each of said reproduction objectives, said means for controlling comprising a device comprising a casing, an opening thereon centered on the optical axis of said printing machine, a plurality of slidable elements in number equal to the number of said reproduction objectives, each of said elements having a light-blocking end an an opposite end, an internally threaded block fast with said opposite end, a plurality of stud screws freely rotatable in said casing, each of said screws being threaded in said block, said device being placed outside the light path separating said negative film from said positive copies in a plane conjugate with the plane containing said diaphragms of said reproduction objectives, whereby rotation of said stud screws causes sliding of said slidable elements relative to said casing across said light beams in said opening for individual control of the light flux passing through each of said reproduction objectives.

References Cited by the Examiner

UNITED STATES PATENTS

| | | |
|---|---|---|
| 1,598,956 | 9/1926 | Capstaff. |
| 2,971,447 | 2/1961 | Debrie. |

NORTON ANSHER, *Primary Examiner.*

RICHARD A. WINTERCORN, *Assistant Examiner.*